(No Model.)
J. F. GROSS.
VEHICLE SPRING.
No. 360,804. Patented Apr. 5, 1887.
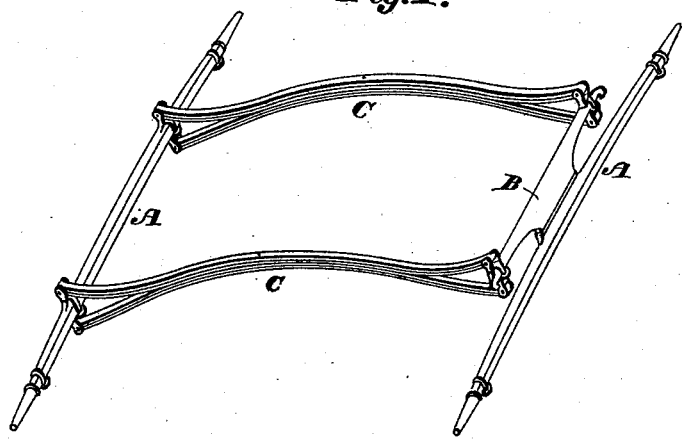
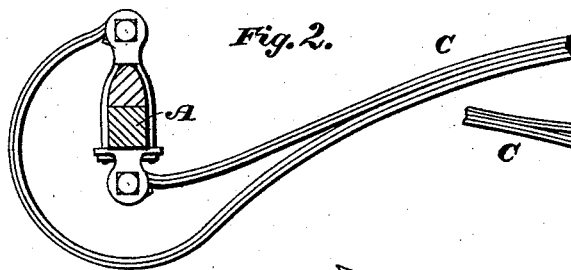
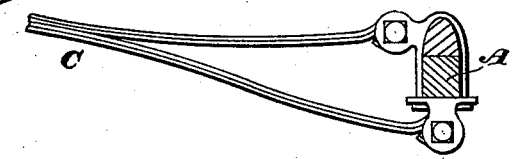
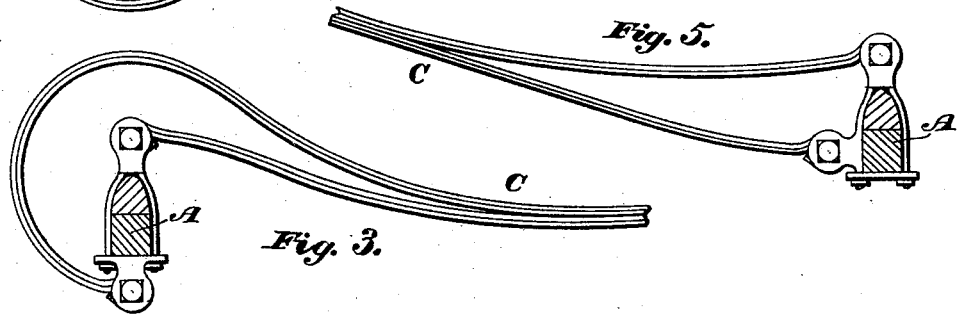
WITNESSES:
Harry Frease
Ellebimith
INVENTOR
John F. Gross
BY
Fred N. Bond
ATTORNEY

UNITED STATES PATENT OFFICE.

JOHN F. GROSS, OF CANTON, OHIO, ASSIGNOR OF ONE-HALF TO PERCY S. SOWERS, OF SAME PLACE.

VEHICLE-SPRING.

SPECIFICATION forming part of Letters Patent No. 360,804, dated April 5, 1887.

Application filed December 20, 1886. Serial No. 222,027. (No model.)

*To all whom it may concern:*

Be it known that I, JOHN F. GROSS, a citizen of the United States, residing at Canton, in the county of Stark and State of Ohio, have invented certain new and useful Improvements in Vehicle-Springs and Running-Gear; and I do hereby declare that the following is a full, clear, and exact description of the same, reference being had to the annexed drawings, making a part of this specification, and to the letters and figures of reference marked thereon, in which—

Figure 1 is a view showing springs properly attached to the running-gear. Fig. 2 is a view showing the lower section of spring attached to the top of the axle or spring-bar and bent or curved below the axle. Fig. 3 is a view showing the top or upper section of the spring attached to the under side of the axle or spring-bar. Figs. 4 and 5 are modifications.

The present invention has relation to vehicle-springs and running-gear; and its nature consists in the different parts and combination of parts hereinafter described, and particularly pointed out in the claim.

Similar letters of reference indicate corresponding parts in all the figures of the drawings.

In the accompanying drawings, A represents the axles, which may be constructed in the ordinary manner. To the front or forward axle is pivotally attached the spring-bar B, which may be substantially of the form shown. To the ends of the spring-bar B are attached the front or forward ends of the springs C C, substantially as shown in the drawings. The rear ends of the springs C C are attached to the rear axle, substantially as shown in the drawings.

The springs proper are substantially of the form shown, and in use are placed parallel to each other. These springs C C are bifurcated at their ends, one of the arms of each spring being properly attached above the axle and spring-bar, and the other arm attached below the axle and spring-bar, substantially as shown in Fig. 1, for the purpose of securely holding the springs C C in proper upright position, and at the same time preventing the axles from twisting or turning.

It will be seen that by my peculiar manner of attaching the springs C C they will take the place of a reach, and that the two springs will act in unison, and that the axles A A will spread apart or come together as the springs C C vibrate. It will be understood that suitable cross-bars are to be attached to the springs C C, for the purpose of attaching the body of the vehicle proper.

Having fully described my invention, what I claim as new, and desire to secure by Letters Patent, is—

The springs C C, having bifurcated ends, the arms of which are attached above and below the rear axle and above and below the spring-bar B, substantially as described, and for the purpose set forth.

In testimony that I claim the above I have hereunto subscribed my name in the presence of two witnesses.

JOHN F. GROSS.

Witnesses:
 E. A. C. SMITH,
 FRED N. BOND.